(12) United States Patent
Chang et al.

(10) Patent No.: US 9,966,770 B2
(45) Date of Patent: May 8, 2018

(54) CHARGING APPARATUS AND CHARGING CONTROL CIRCUIT AND CONTROL METHOD THEREOF

(71) Applicant: RICHTEK TECHNOLOGY CORPORATION, Zhubei, HsinChu (TW)

(72) Inventors: Wei-Hsu Chang, New Taipei (TW); Ta-Yung Yang, Taoyuan (TW); Pei Yu Chiang, New Taipei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 86 days.

(21) Appl. No.: 15/255,092

(22) Filed: Sep. 1, 2016

(65) Prior Publication Data

US 2017/0310136 A1    Oct. 26, 2017

Related U.S. Application Data

(60) Provisional application No. 62/326,171, filed on Apr. 22, 2016.

(51) Int. Cl.
*H02J 7/00*    (2006.01)

(52) U.S. Cl.
CPC ............ *H02J 7/0021* (2013.01); *H02J 7/007* (2013.01); *H02J 7/0045* (2013.01); *H02J 7/0052* (2013.01); *H02J 2007/0059* (2013.01); *H02J 2007/0096* (2013.01)

(58) Field of Classification Search
CPC ....... Y02E 60/12; H02J 7/0042; H02J 7/0045; H01M 10/46; H01M 10/44
USPC ........................................................ 320/107
See application file for complete search history.

(56) References Cited

U.S. PATENT DOCUMENTS

| | | | | | |
|---|---|---|---|---|---|
| 5,467,005 | A | * | 11/1995 | Matsumoto | H01M 10/44 320/148 |
| 5,578,914 | A | * | 11/1996 | Morita | H01M 10/44 320/122 |
| 5,811,953 | A | * | 9/1998 | Watanabe | H02P 8/12 318/109 |
| 6,900,624 | B2 | * | 5/2005 | Abo | B60L 11/1851 323/224 |
| 8,889,287 | B2 | * | 11/2014 | Suzuki | H01M 10/0418 429/152 |

* cited by examiner

*Primary Examiner* — Arun Williams
(74) *Attorney, Agent, or Firm* — Tung & Associates

(57) ABSTRACT

A charging apparatus includes a power conversion circuit for charging a battery, and a charging control circuit. The battery has a battery net voltage. The charging control circuit includes a conversion control circuit, a sensing circuit and a determining circuit. The conversion control circuit controls the power conversion circuit to generate plural pairs of DC output voltage levels and DC output current levels, wherein each DC output voltage level and its corresponding DC output current level are a voltage-current pair. The sensing circuit senses the DC output voltage levels and/or the DC output current levels. The determining circuit determines the battery net voltage according to plural voltage-current pairs.

13 Claims, 3 Drawing Sheets

CHARGING APPARATUS AND CHARGING CONTROL CIRCUIT AND CONTROL METHOD THEREOF

CROSS REFERENCE

The present invention claims priority to U.S. 62/326,171, filed on Apr. 22, 2016.

BACKGROUND OF THE INVENTION

Field of Invention

The present invention relates to a charging apparatus. Particularly it relates to a charging apparatus which can compensate the parasitic resistance inside the battery or on the charging path. The present invention also relates to a charging control circuit and a charging control method of the charging apparatus.

Description of Related Art

FIG. 1 shows a block diagram of a prior art charging apparatus. Charging apparatus 1 includes a power conversion circuit 30 which converts an input power VIN to a DC output power to charge a battery 20, wherein the DC output power includes a DC output voltage VBUS and a DC output current IDC. The battery 20 includes a batter cell 201. From a viewpoint outside the battery 20, the battery 20 has a battery voltage VBATS. However, the battery 20 has an inner equivalent resistance which may be expressed as RI, and hence the actual voltage of the battery cell 201 is lower than the battery voltage VBATS. The actual voltage of the battery cell 201 is expressed as VBAT, which will be referred to as the battery net voltage hereinafter. The inner equivalent resistance RI of the battery 20 may be caused by a parasitic resistance, conduction line resistance, contact resistance, or other resistances inside the battery 20.

The prior art of FIG. 1 has a drawback that, because the battery voltage VBATS is not equal to the battery net voltage VBAT due to the inner equivalent resistance RI, there is a significant voltage difference between the battery voltage VBATS and the battery net voltage VBAT when the charging current is relatively high. However, the prior art charging apparatus controls the charging process simply according to information outside the battery 20 (the DC output voltage VBUS or the battery voltage VBATS). When there is a significant voltage difference between the battery voltage VBATS and the battery net voltage VBAT, the battery net voltage VBAT will be misjudged such that the battery 20 is not sufficiently charged. For example, a typical charging control method is to charge a battery by a constant current during an earlier charging phase (constant current phase) wherein the battery voltage is still far from the target voltage, and to charge the battery according to a constant target voltage, wherein the charging current is smaller, during a later charging phase (constant voltage phase) when the battery voltage is close to the target voltage. However when the voltage net voltage is misjudged, the transition to the constant voltage phase will occur too early, which leads to a longer charging time. And because the actual voltage of the battery cell (i.e. the battery net voltage VBAT) is misjudged, the battery will not be fully charged.

Compared to the prior art of FIG. 1, the present invention can precisely sense the battery net voltage, free from the effect caused by the inner equivalent resistance of the battery inner or the parasitic resistance on the charging path, so that the charging current and charging voltage are better controlled to assure that the battery is fully charged, and to reduce the charging time.

SUMMARY OF THE INVENTION

From one perspective, the present invention provides a charging apparatus, comprising: a power conversion circuit, configured to operably convert an input power to a DC output power to charge a battery via a charging path, wherein the DC output power includes a DC output voltage and a DC output current, and the battery has a battery net voltage, and there is a voltage drop between the DC output voltage and the battery net voltage, wherein the voltage drop is caused by a resistance effect; and a charging control circuit, including: a conversion control circuit, configured to operably control the power conversion circuit such that the DC output voltage and the DC output current include at least two pairs of different DC output voltage levels and DC output current levels, wherein each DC output voltage level and a corresponding DC output current level form a voltage-current pair; a sensing circuit, configured to operably sense the DC output voltage level and/or the DC output current level; and a determining circuit, configured to operably determine a resistance of the resistance effect and/or the battery net voltage according to two or more of the voltage-current pairs.

In one embodiment, the resistance effect includes a resistance of the charging path and/or an inner equivalent resistance of the battery.

In one embodiment, the charging apparatus further includes a cable having one end coupled to the power conversion circuit and the other end configured to be connected to the battery. The cable preferably includes power lines and first and second connectors, wherein the power lines are configured to be connected to the power conversion circuit via the first and the second connector and to the battery via the second connector.

In one embodiment, the charging apparatus further includes a switch which is coupled between the power conversion circuit and the battery.

In one embodiment, after the resistance of the resistance effect and/or the battery net voltage is obtained, the conversion control circuit controls the power conversion circuit to charge the battery by a constant current or by a constant voltage according to the resistance of the resistance effect and/or the battery net voltage.

In one embodiment, the plural voltage-current pairs are obtained within a period during which the battery net voltage does not change more than a predetermined voltage difference.

From another perspective, the present invention provides a charging control circuit, configured to operably control a charging apparatus, wherein the charging apparatus includes: a power conversion circuit, configured to operably convert an input power to a DC output power to charge a battery via a charging path, wherein the DC output power includes a DC output voltage and a DC output current, and the battery has a battery net voltage, and there is a voltage drop between the DC output voltage and the battery net voltage, wherein the voltage drop is caused by a resistance effect; the charging control circuit comprising: a conversion control circuit, configured to operably control the power conversion circuit such that the DC output voltage and the DC output current include at least two pairs of different DC output voltage levels and DC output current levels, wherein each DC output voltage level and a corresponding DC output current level form a voltage-current pair; a sensing circuit, configured to operably sense the DC output voltage level and/or the DC output current level; and a determining circuit, configured to operably determine a resistance of the resistance effect and/or the battery net voltage according to two or more of the voltage-current pairs.

From another perspective, the present invention provides a charging control method, comprising: controlling a power conversion circuit to provide a DC output power to charge a battery via a charging path, wherein the DC output power includes a DC output voltage and a DC output current, and the battery has a battery net voltage, and there is a voltage drop between the DC output voltage and the battery net voltage, wherein the voltage drop is caused by a resistance effect; charging the battery with a first DC output current level and sensing a corresponding DC output voltage level, or charging the battery with a first DC output voltage level and sensing a corresponding DC output current level, to obtain a first voltage-current pair; charging the battery with a second DC output current level and sensing a corresponding DC output voltage level, or charging the battery with a second DC output voltage level and sensing a corresponding DC output current level, to obtain a second voltage-current pair; and determining a resistance of the resistance effect and/or the battery net voltage according to the first and the second voltage-current pairs.

In one embodiment, the charging control method further includes: after the resistance of the resistance effect and/or the battery net voltage is obtained, charging the battery with a third DC output current level when the difference between the battery net voltage and a target voltage is larger than a pre-determined value, and charging the battery according to a third DC output voltage level when the difference between the battery net voltage and the target voltage is smaller than the pre-determined value.

In one embodiment, the first and the second voltage-current pairs are obtained within a period during which the battery net voltage does not change more than a predetermined voltage difference.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
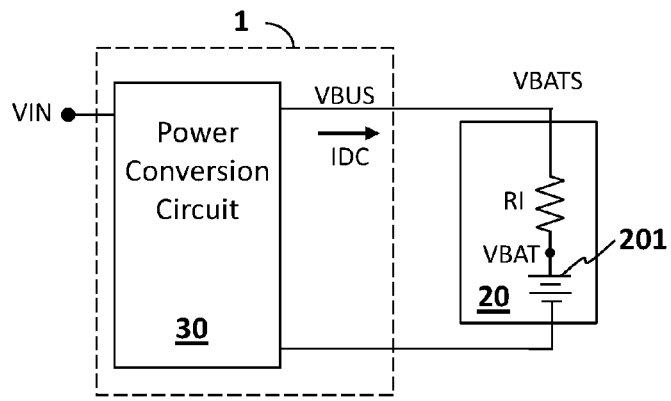
FIG. 1 shows a block diagram of a prior art charging apparatus.
Figure 2A:
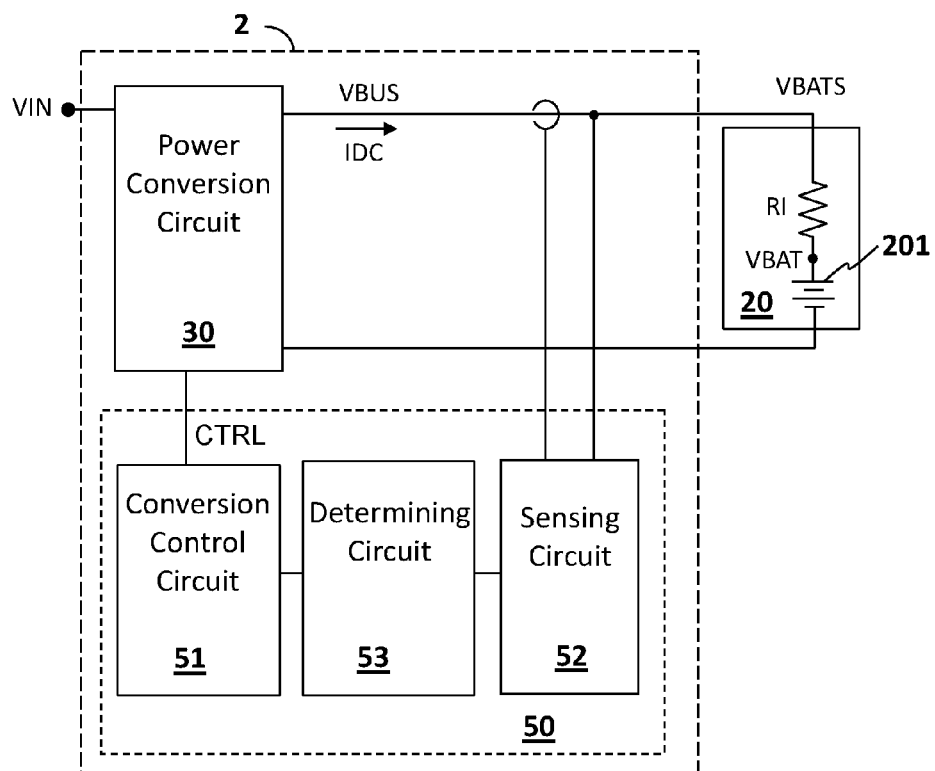
FIG. 2A shows a block diagram of an embodiment of the charging apparatus according to the present invention.

FIG. 2A shows a block diagram of an embodiment of the charging apparatus (charging apparatus 2) according to the present invention. Charging apparatus 2 includes a power conversion circuit 30 and a charging control circuit 50. The power conversion circuit 30 converts an input power VIN to a DC output power to charge a battery 20 via a charging path, wherein the DC output power includes a DC output voltage VBUS and a DC output current IDC, and the battery 20 includes a batter cell 201. From the viewpoint outside the battery 20, the battery 20 includes a battery voltage VBATS. However, the battery 20 has an inner equivalent resistance RI which causes a resistance effect, such that the actual voltage of the battery cell 201 (referred to as the battery net voltage VBAT) is lower than the battery voltage VBATS. The line equivalent resistance RI of the battery 20 may be caused by a parasitic resistance, conduction line resistance, contact resistance, or other resistances inside the battery 20.

The charging control circuit 50 includes a conversion control circuit 51, a sensing circuit 52, and a determining circuit 53. The conversion control circuit 51 generates a conversion control signal CTRL for controlling the power conversion circuit 30 to generate the DC output voltage VBUS and the DC output current IDC which are supplied to the battery 20. The sensing circuit 52 senses the DC output voltage VBUS and/or the DC output current IDC (when the DC output voltage VBUS is under control or is known, it is only required to sense the DC output current IDC; when the DC output current IDC is under control or is known, it is only required to sense the DC output voltage VBUS; however, the DC output voltage VBUS and the DC output current IDC can still be sensed even if they are under control or known).

The determining circuit 53 determines the battery net voltage or the line equivalent resistance RI according to two or more pairs of the DC output voltage VBUS and the DC output current IDC. In one embodiment, the determining circuit 53 further determines a charging voltage level VDCc or a charging current level IDCc according to the battery net voltage or the line equivalent resistance RI, and the conversion control circuit 51 controls the power conversion circuit 30 to charge the battery 20 with the charging voltage level VDCc or the charging current level IDCc accordingly.

At a given time point or within a short period of time, the battery net voltage VBAT does not change too much (i.e., the battery net voltage VBAT does not change more than a voltage difference) under different levels of charging currents. On the other hand, however, the voltage drop caused by the inner equivalent resistance RI has a linear relationship with the current flowing through it. Hence, the relationship among the DC output voltage VBUS, the DC output current IDC, and the battery net voltage VBAT may be expressed as the following equation:

$$VBUS = IDC*RIP + VBAT \quad \text{(eq. 1)}$$

In eq. 1, RIP indicates the resistance of the inner equivalent resistance RI.

Figure 2B:
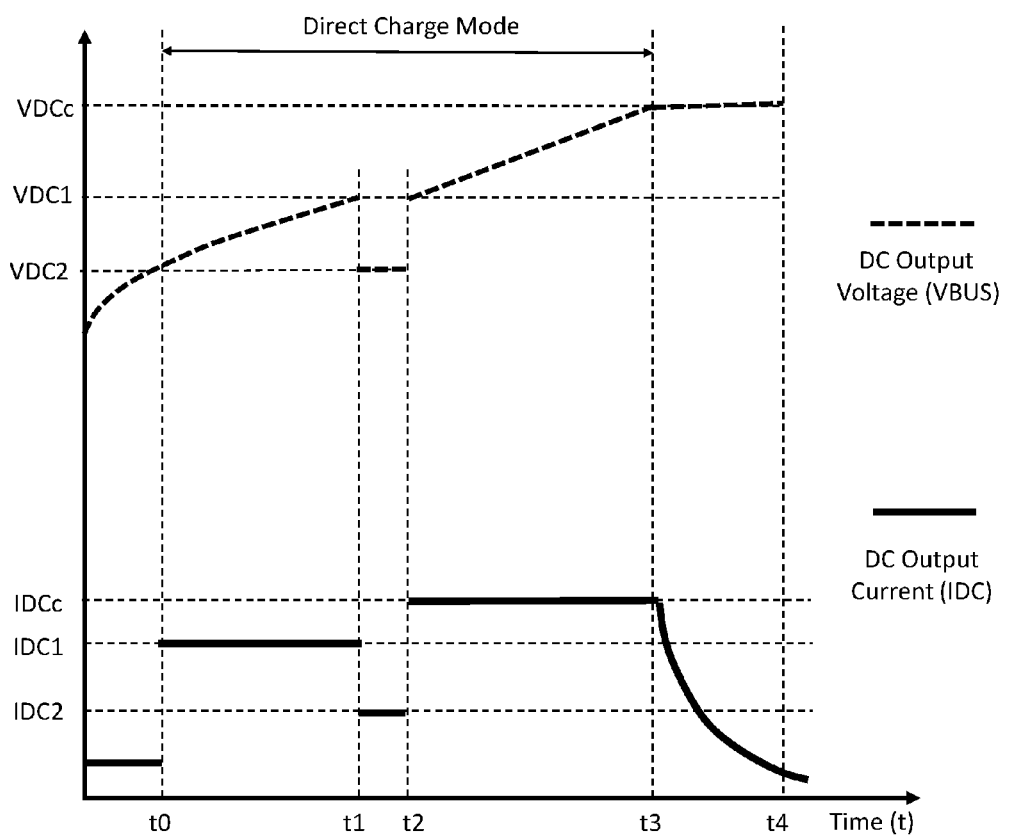
FIG. 2B shows an embodiment of the charging method according to the present invention.

Referring to FIG. 2B, in one embodiment, the battery net voltage VBAT or the inner equivalent resistance RI can be determined according to two or more pairs of the DC output voltage VBUS and the DC output current IDC by the following steps: first, charging the battery 20 with a first DC output current level IDC1, and sensing the level of the DC output voltage VBUS to obtained a sensed first DC output voltage level VDC1; or, charging the battery 20 with the first DC output voltage level VDC1, and sensing the level of the DC output current IDC to obtained a sensed first DC output current level IDC1. The voltage level VDC1 and the current level IDC1 form a first voltage-current pair. This step is performed for example at the time point t1 shown in FIG. 2B. Thus, eq. 2 can be obtained according to eq. 1:

$$VDC1 = IDC1*RIP + VBAT \quad \text{(eq. 2)}$$

Second, charging the battery 20 with a second DC output current level IDC2, and sensing the level of the DC output voltage VBUS to obtained a sensed second DC output voltage level VDC2; or, charging the battery 20 with the second DC output voltage level VDC2, and sensing the level of the DC output current IDC to obtained a sensed second DC output current level IDC2. The voltage level VDC2 and the current level IDC2 form a second voltage-current pair. This step may be performed right after the time point t1 shown in FIG. 2B, at for example the time point t2. Note that the time difference between the time point t1 and the time point t2 should not be too long to avoid a significant change on the battery net voltage VBAT. That is, the first and the second voltage-current pairs are obtained within a time period, and preferably, a change of the battery net voltage within this time period is not more than a predetermined voltage difference. Thus, eq. 3 can be obtained according to eq. 1

$$VDC2 = IDC2 * RIP + VBAT \quad \text{(eq. 3)}$$

Eq. 4 and eq. 5 can be obtained by solving eq. 2 and eq. 3:

$$RIP = (VDC1 - VDC2)/(IDC1 - IDC2) \quad \text{(eq. 4)}$$

$$\begin{aligned}VBAT &= VDC2 - IDC2 * RIP \quad \text{(eq. 5)}\\ &= VDC2 - IDC2 * [(VDC1 - VDC2)/(IDC1 - IDC2)]\\ &= VDC2 - (IDC2 * VDC1 - IDC2 * VDC2)/(IDC1 - IDC2)\end{aligned}$$

According to the above equations, the inner equivalent resistance RIP and the current actual voltage on the battery cell 201 (i.e. the current battery net voltage VBAT) can be obtained. The battery net voltage VBAT obtained by eq. 5 is the battery net voltage VBAT at the time point t2. The equations described in the above are provided for illustration. In some circumstances, the battery net voltage VBAT may have some non-linear relationships under different current levels, and it can be readily seen that by the same spirit of the present invention, the battery net voltage VBAT or the inner equivalent resistance RIP can be obtained according to plural voltage-current pairs.

In one embodiment, after obtaining the inner resistance RIP and the battery net voltage VBAT, the charging process can be controlled according to the information obtained. For example, during an earlier charging phase when the difference between the battery net voltage VBAT and the target voltage is still large (e.g. larger than a pre-determined value), the battery 20 can be charged by a constant current (for example charged by a charging current level IDCc between the time points t2 and t3 shown in FIG. 2B), wherein the charging current is larger; and during a later charging phase when the difference between the battery net voltage VBAT and the target voltage is smaller (e.g. smaller than the pre-determined value), he battery 20 can be charged by a constant voltage (for example charged by a charging voltage level VDCc between the time points t3 and t4 shown in FIG. 2B), wherein the charging current is smaller. Because the inner equivalent resistance RIP is known, the determining circuit 53 can calculate the present battery net voltage VBAT (continuously or intermittently) according to the DC output voltage VBUS and the current DC output current IDC which are sensed by the sensing circuit 52. The charging behavior from the time point t0 to the time point t3 in the figure may be referred to as a "direct charging mode" since the charging current level to charge the battery 20 is directly determined by the charging control circuit 50 of the charging apparatus 2.

Figure 3:
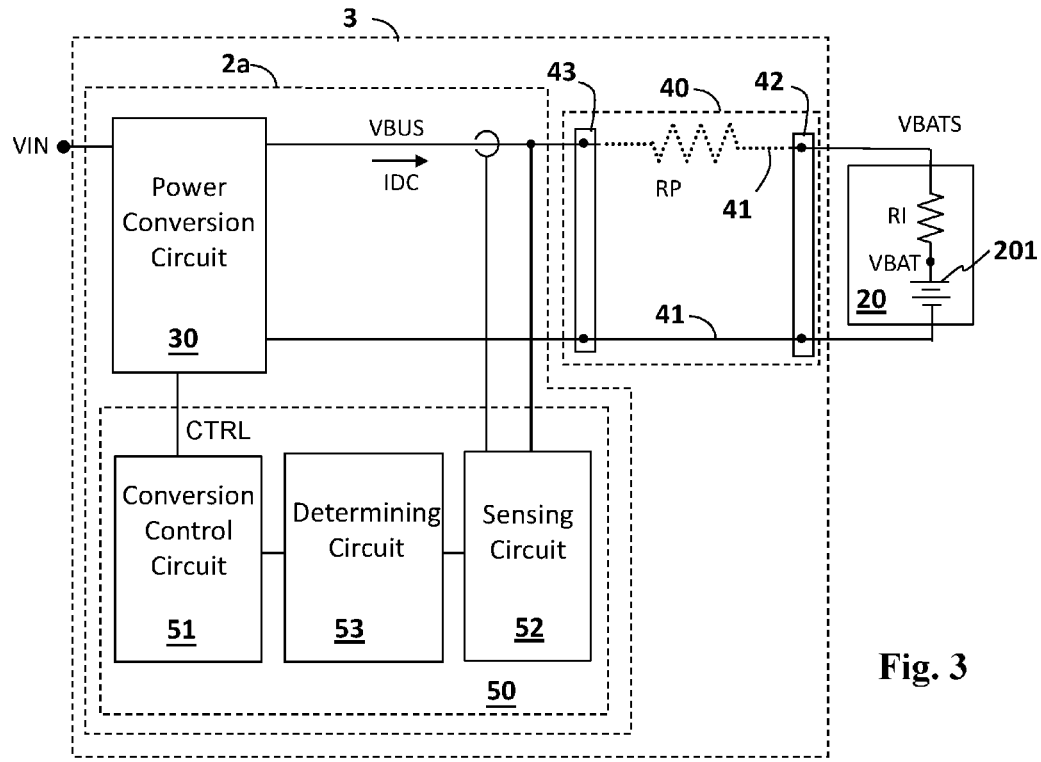
FIG. 3 shows a block diagram of another embodiment of the charging apparatus according to the present invention.

Referring to FIG. 3, in one embodiment, the charging apparatus of the present invention (charging apparatus 3) is a separable device, which may include for example but not limited to a charging circuit 2a and a cable 40, wherein the charging circuit 2a can charge the battery 20 via the cable 40. The charging circuit 2a may be, for example but not limited to, a travel adaptor. The battery may be, for example but not limited to, a battery of a smartphone, or an independent battery (for example a power bank). The cable 40 may be, for example but not limited to, a cable compliant with USB or USB PD specifications (USB: "Universal Serial Bus"; USB PD: "Universal Serial Bus Power Delivery"). The cable 40 may include for example but not limited to power lines 41 and connectors 42 and 43, wherein the power lines 41 are connected to the battery 20 via the connector and connected to the power conversion circuit 30 via the connector 43.

As shown in this embodiment, the power lines 41 and the connectors 42 and 43 of the cable 40 may contain parasitic and other resistances, wherein a total of these resistances is expressed by RP (referred to as the line resistance). Thus:

$$VBUS = IDC*(RPP + RIP) + VBAT \quad \text{(eq. 6)}$$

wherein RPP indicates the resistance of the line resistance RP. In accordance with the present invention, the total resistance effect caused by the line resistance RP and the inner equivalent resistance RI may be obtained by a method described in the above, that is, similar to the embodiment of FIG. 2B, by charging the battery 20 with two different DC output current levels and sensing the corresponding DC output voltages, or by charging the battery 20 with two different DC output voltage levels and sensing the corresponding DC output currents, the total resistance effect caused by the line resistance RP and the inner equivalent resistance RI, and the present batter net voltage VBAT, can be obtained, and the charging process can be controlled according to the information obtained.

Certainly, if only the 5 line resistance RP exists but there is no inner equivalent resistance inside the battery 20, that is $$VBUS = IDC*RPP + VBAT \quad \text{(eq. 7)}$$

the resistance RPP of the line resistance RP can still be obtained by the method described above according to the present invention, and the charging process can be controlled accordingly.

Figure 4:
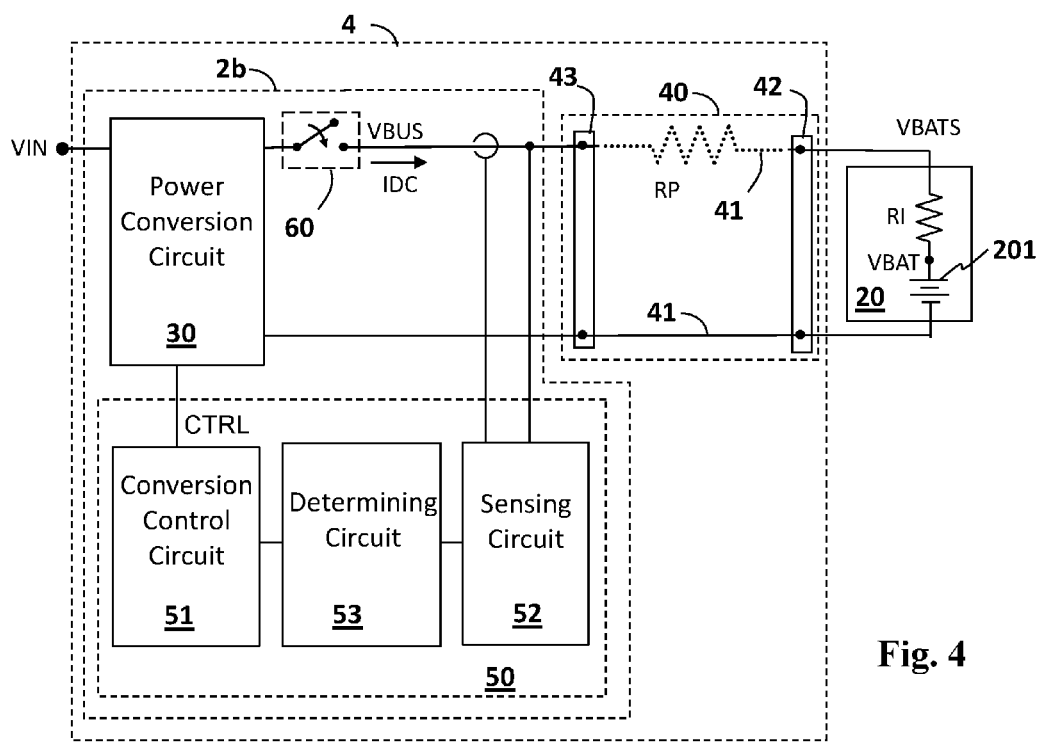
FIG. 4 shows a block diagram of another embodiment of the charging apparatus according to the present invention.

Referring to FIG. 4, in one embodiment, the charging circuit 2b of the charging apparatus 4 of the present invention further includes a switch 60. The switch 60 is controlled to be conductive in the direct charging mode for directly charging the battery 20. Under circumstances other than the direct charging mode, the charging circuit 2b may supply power to other circuits through other paths (not shown), and may (but not necessary) charge the battery 20 indirectly through other circuits, but does not directly control the charging current for the battery 20.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. As an example, the switch 60 may be applied in the embodiment shown in FIG. 2A. As another example, the plural voltage-current pairs may be obtained in any suitable ways, such as: supplying a current and sensing a corresponding voltage to obtain a first voltage-current pair, and applying another voltage and sensing a corresponding current to obtain a second voltage-current pair. As another example, in the aforementioned embodiments, the total resistance effect are sensed and determined by obtaining the voltage-current pairs on the output terminal of the power conversion circuit; however, the voltage-current pairs may be obtained on other nodes on the charging path or inside the battery, and it may not be necessary to obtain the total resistance effect but instead a partial resistance effect. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A charging control method, comprising:
controlling a power conversion circuit to provide a DC output power to charge a battery via a charging path, wherein the DC output power includes a DC output voltage and a DC output current, and the battery has a battery net voltage, and there is a voltage drop between the DC output voltage and the battery net voltage, wherein the voltage drop is caused by a resistance effect;
charging the battery with a first DC output current level and sensing a corresponding DC output voltage level, or charging the battery with a first DC output voltage level and sensing a corresponding DC output current level, to obtain a first voltage-current pair;
charging the battery with a second DC output current level and sensing a corresponding DC output voltage level, or charging the battery with a second DC output voltage level and sensing a corresponding DC output current level, to obtain a second voltage-current pair; and
determining a resistance of the resistance effect and/or the battery net voltage according to the first and the second voltage-current pairs.

2. The charging control method of claim 1, wherein the resistance effect includes a resistance of the charging path and/or an inner equivalent resistance of the battery.

3. The charging control method of claim 1, further including: after the resistance of the resistance effect and/or the battery net voltage is obtained, charging the battery with a third DC output current level when the difference between the battery net voltage and a target voltage is larger than a pre-determined value, and charging the battery according to a third DC output voltage level when the difference between the battery net voltage and the target voltage is smaller than the pre-determined value.

4. The charging control method of claim 1, wherein the first and the second voltage-current pairs are obtained within a period during which the battery net voltage does not change more than a predetermined voltage difference.

5. A charging apparatus, comprising:
a power conversion circuit, configured to operably convert an input power to a DC output power to charge a battery via a charging path, wherein the DC output power includes a DC output voltage and a DC output current, and the battery has a battery net voltage, and there is a voltage drop between the DC output voltage and the battery net voltage, wherein the voltage drop is caused by a resistance effect; and
a charging control circuit, including:
a conversion control circuit, configured to operably control the power conversion circuit such that the DC output voltage and the DC output current include at least two pairs of different DC output voltage levels and DC output current levels, wherein each DC output voltage level and a corresponding DC output current level form a voltage-current pair;
a sensing circuit, configured to operably sense the DC output voltage level and/or the DC output current level; and
a determining circuit, configured to operably determine a resistance of the resistance effect and/or the battery net voltage according to two or more of the voltage-current pairs.

6. The charging apparatus of claim 5, wherein the resistance effect includes a resistance of the charging path and/or an inner equivalent resistance of the battery.

7. The charging apparatus of claim 5, further including a cable having one end coupled to the power conversion circuit and the other end configured to be connected to the battery.

8. The charging apparatus of claim 6, wherein the cable includes power lines and first and second connectors, wherein the power lines are configured to be connected to the power conversion circuit via the first and the second connector and to the battery via the second connector.

9. The charging apparatus of claim 5, further including a switch which is coupled between the power conversion circuit and the battery.

10. The charging apparatus of claim 5, wherein after the resistance of the resistance effect and/or the battery net voltage is obtained, the conversion control circuit controls the power conversion circuit to charge the battery by a constant current or by a constant voltage according to the resistance of the resistance effect and/or the battery net voltage.

11. A charging control circuit, configured to operably control a charging apparatus, wherein the charging apparatus includes: a power conversion circuit, configured to operably convert an input power to a DC output power to charge a battery via a charging path, wherein the DC output power includes a DC output voltage and a DC output current, and the battery has a battery net voltage, and there is a voltage drop between the DC output voltage and the battery net voltage, wherein the voltage drop is caused by a resistance effect; the charging control circuit comprising:
a conversion control circuit, configured to operably control the power conversion circuit such that the DC output voltage and the DC output current include at least two pairs of different DC output voltage levels and DC output current levels, wherein each DC output voltage level and a corresponding DC output current level form a voltage-current pair;

a sensing circuit, configured to operably sense the DC output voltage level and/or the DC output current level; and a determining circuit, configured to operably determine a resistance of the resistance effect and/or the battery net voltage according to two or more of the voltage-current pairs.

12. The charging control circuit of claim 11, wherein after the resistance of the resistance effect and/or the battery net voltage is obtained, the conversion control circuit controls the power conversion circuit to charge the battery by a constant current or by a constant voltage according to the resistance of the resistance effect and/or the battery net voltage.

13. The charging control circuit of claim 11, wherein the two or more voltage-current pairs are obtained within a period during which the battery net voltage does not change more than a predetermined voltage difference.

* * * * *